(12) United States Patent
Roberts et al.

(10) Patent No.: US 10,835,900 B2
(45) Date of Patent: Nov. 17, 2020

(54) MICROFLUIDIC DEVICE WITH MULTIPLE TEMPERATURE ZONES

(71) Applicant: Sharp Life Science (EU) Limited, Oxford (GB)

(72) Inventors: Phillip Mark Shryane Roberts, Oxford (GB); Pamela Ann Dothie, Oxford (GB); Benjamin James Hadwen, Oxford (GB)

(73) Assignee: Sharp Life Science (EU) Limited, Oxford (GB)

( * ) Notice: Subject to any disclaimer, the term of this patent is extended or adjusted under 35 U.S.C. 154(b) by 145 days.

(21) Appl. No.: 15/832,888

(22) Filed: Dec. 6, 2017

(65) Prior Publication Data

US 2018/0221882 A1 Aug. 9, 2018

(30) Foreign Application Priority Data

Feb. 6, 2017 (EP) .................................... 17154847

(51) Int. Cl.
*B01L 3/00* (2006.01)
*B01L 7/00* (2006.01)
(Continued)

(52) U.S. Cl.
CPC ..... *B01L 3/502792* (2013.01); *B01L 3/50273* (2013.01); *B01L 3/502707* (2013.01);
(Continued)

(58) Field of Classification Search
CPC ............. B01L 3/5027; B01L 3/502792; B01L 3/502715; B01L 3/50273;
(Continued)

(56) References Cited

U.S. PATENT DOCUMENTS

| 2003/0062359 A1* | 4/2003 | Ho | H01L 21/67248 219/444.1 |
| 2008/0160601 A1* | 7/2008 | Handique | B01L 3/502715 435/287.2 |

(Continued)

FOREIGN PATENT DOCUMENTS

EP 1462517 9/2004

OTHER PUBLICATIONS

European Search Report of EP 17154847.2 dated Aug. 3, 2017, 6 pages.

*Primary Examiner* — James Lin
*Assistant Examiner* — Vivian A Tran
(74) *Attorney, Agent, or Firm* — Renner, Otto, Boisselle & Sklar, LLP

(57) ABSTRACT

An EWOD device for processing multiple droplets through multiple temperature zones. The device is configured to achieve a high spatial density of temperature zones with a wide temperature difference between hot and cold zones. A first set of temperature control elements is arranged above (or below) a fluid gap in an EWOD device and a second set of temperature control elements is arranged below (or above) the fluid gap. A temperature control element of one set is offset from temperature control elements of the other set in the plane of the fluid gap. The temperature control element of one set may be located at a different separation from the fluid gap to the temperature control element of the other set. The device has an optional temperature control element and/or arrangement which offsets the low temperature point from the inlet temperature. The two sets of temperature control elements are substantially interacting, in the sense that they cannot be considered to be thermally isolated from one another. This invention also describes (Continued)

methods to process multiple droplets within the multiple temperature zones.

16 Claims, 13 Drawing Sheets

(51) Int. Cl.
    *G01N 27/447* (2006.01)
    *G05D 23/19* (2006.01)
(52) U.S. Cl.
    CPC ......... *B01L 3/502715* (2013.01); *B01L 7/525* (2013.01); *B01L 7/54* (2013.01); *G01N 27/44704* (2013.01); *G01N 27/44708* (2013.01); *G01N 27/44791* (2013.01); *G05D 23/19* (2013.01); *B01L 3/50851* (2013.01); *B01L 2300/0645* (2013.01); *B01L 2300/089* (2013.01); *B01L 2300/0816* (2013.01); *B01L 2300/0887* (2013.01); *B01L 2300/18* (2013.01); *B01L 2300/1805* (2013.01); *B01L 2300/1822* (2013.01); *B01L 2300/1827* (2013.01); *B01L 2300/1861* (2013.01); *B01L 2300/1894* (2013.01); *B01L 2400/0427* (2013.01)
(58) Field of Classification Search
    CPC .... B01L 3/502784–502792; B01L 2300/0887; B01L 2300/1894; B01L 7/525; B01L 7/54; B01L 2400/0427; B01L 2400/0421; B01L 3/502707; B01L 2300/0645; B01L 2300/0816; B01L 2300/089; B01L 2300/1805; B01L 2300/1822; B01L 2300/1827; B01L 2300/1861; B01L 3/50851; B01L 7/00; B01L 2300/18–1833; B01L 3/00; G01N 27/44704; G01N 27/44708; G01N 27/44791; G01N 27/447; G05D 23/19; G02B 26/005; G02B 2207/115
    See application file for complete search history.

(56) References Cited

U.S. PATENT DOCUMENTS

| | | | |
|---|---|---|---|
| 2010/0279392 A1* | 11/2010 | Kodama | B01L 3/5027 435/286.1 |
| 2011/0039305 A1* | 2/2011 | Termaat | B01L 7/52 435/91.2 |
| 2011/0048951 A1* | 3/2011 | Wu | B01L 3/502792 204/600 |
| 2013/0017544 A1 | 1/2013 | Eckhardt et al. | |
| 2013/0092539 A1* | 4/2013 | Pollack | C12Q 1/68 204/452 |
| 2013/0213812 A1 | 8/2013 | Ludwig | |
| 2014/0263279 A1* | 9/2014 | Vandersleen | B01L 7/00 219/477 |

\* cited by examiner

Figure 1: PRIOR ART

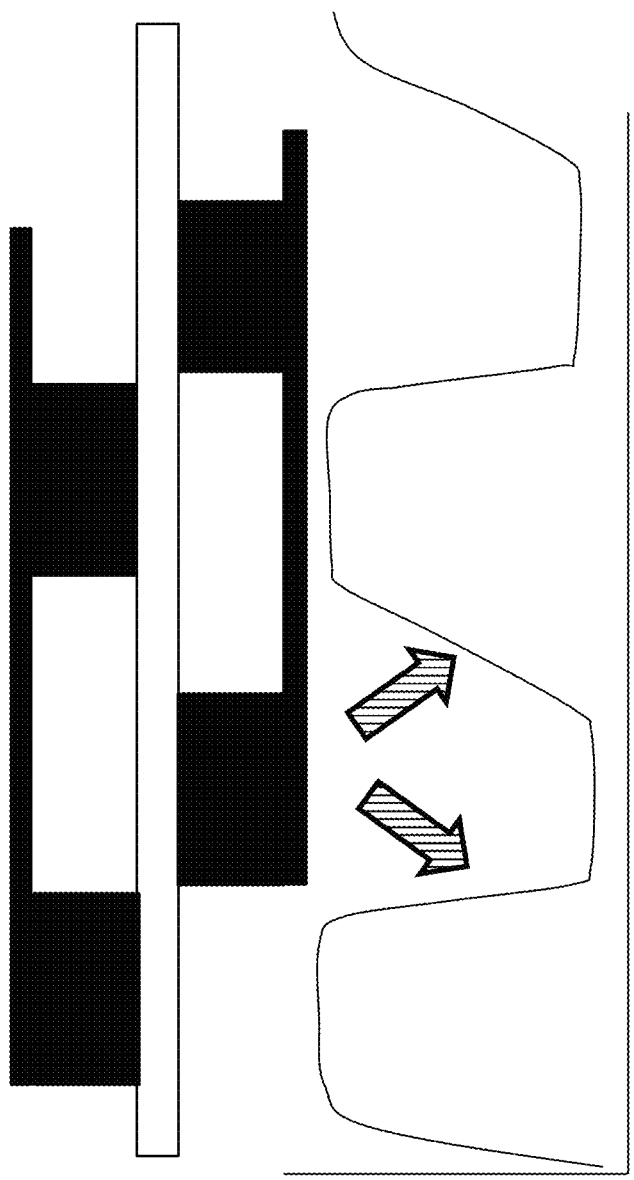

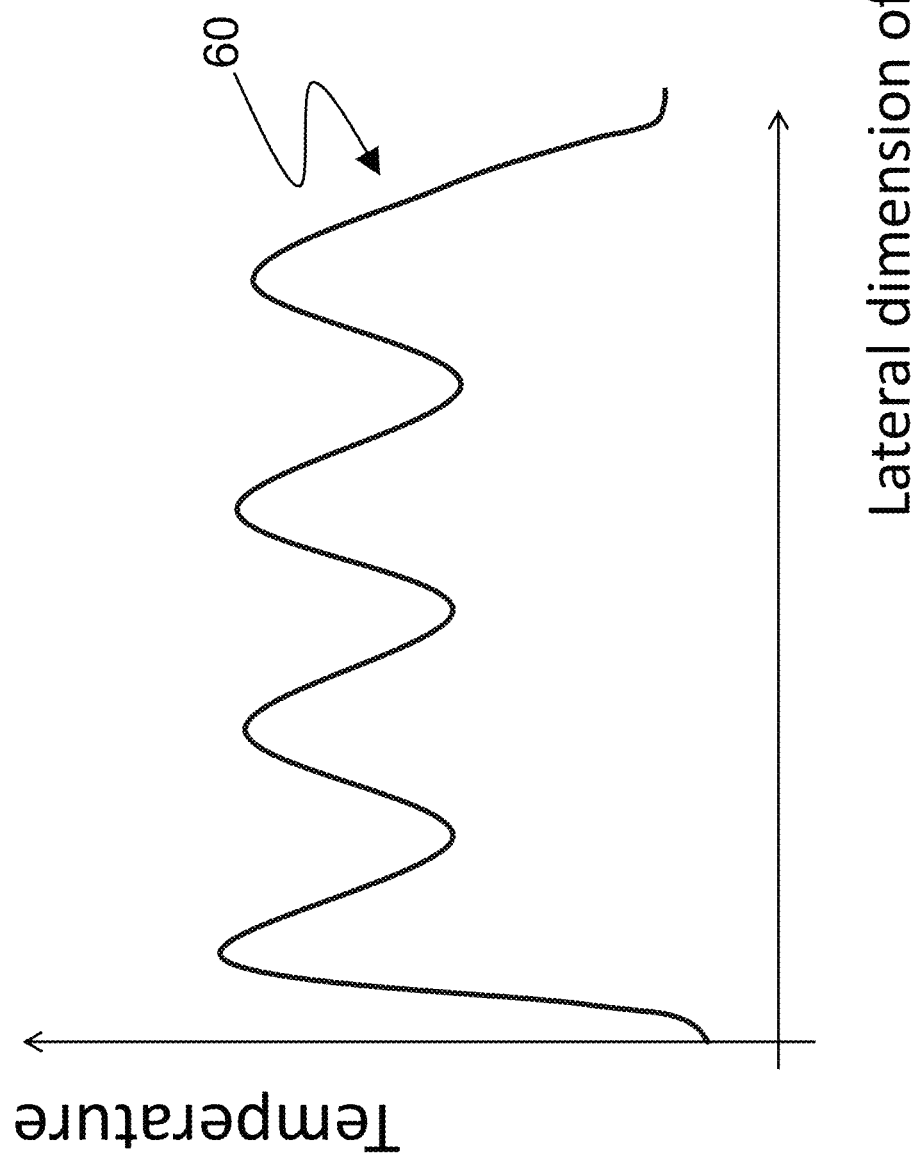

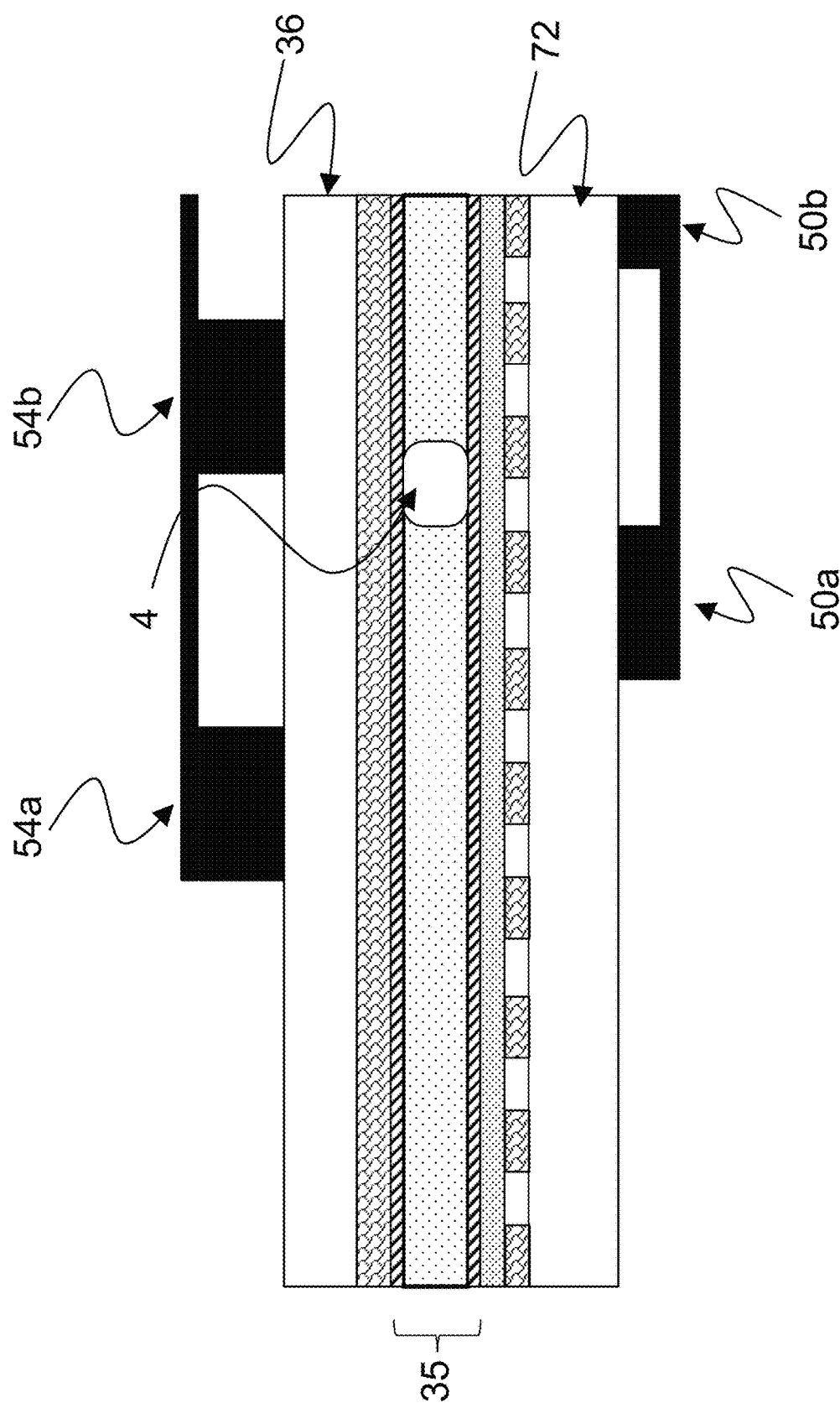

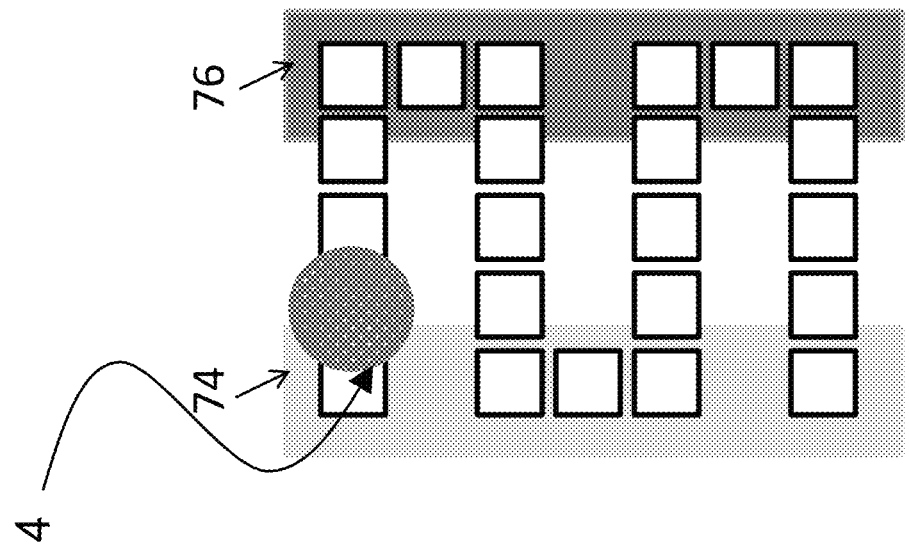
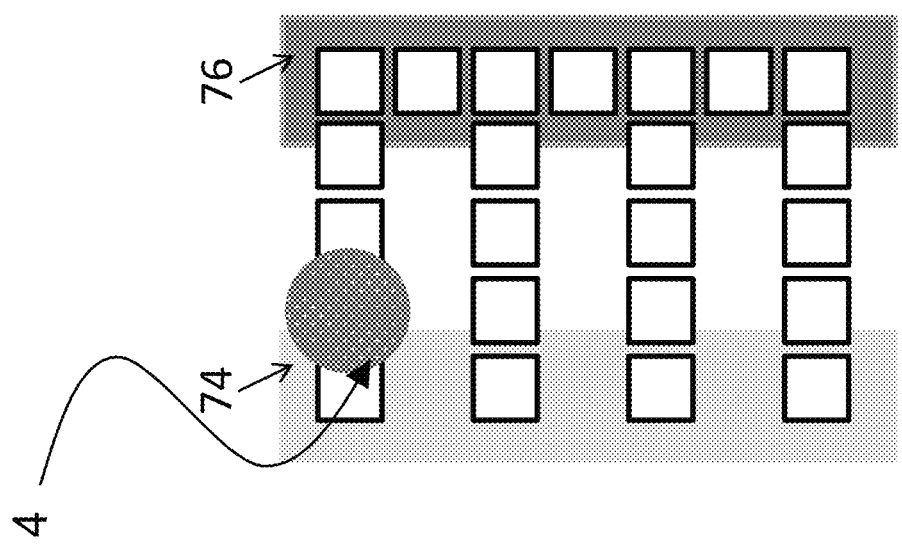
Figure 10

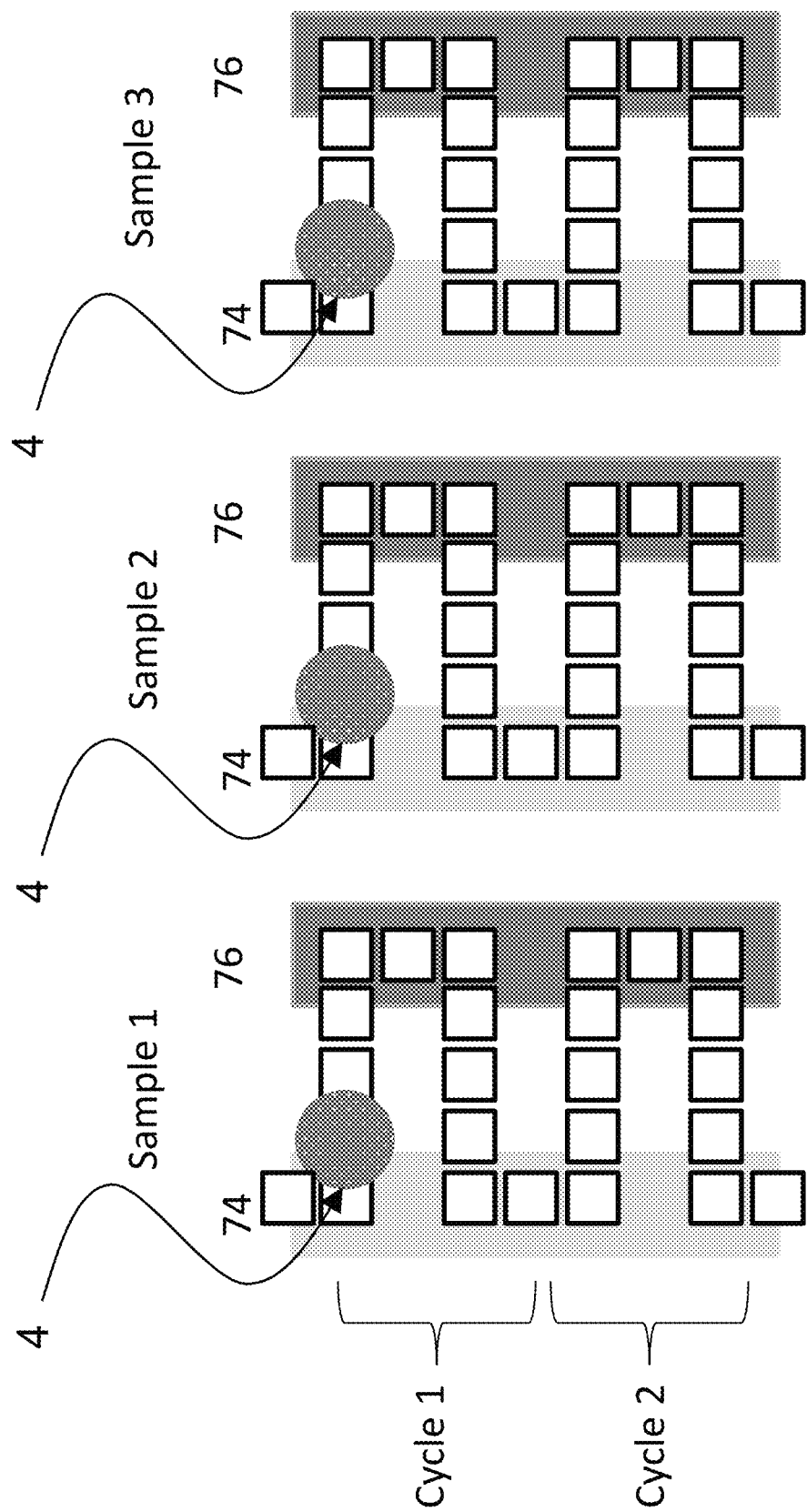

US 10,835,900 B2

MICROFLUIDIC DEVICE WITH MULTIPLE TEMPERATURE ZONES

RELATED APPLICATION DATA

Pursuant to 35 U.S.C. § 119, this application claims priority benefit to European Patent Application No. 17154847.2 filed on Feb. 6, 2017, the content of which is incorporated here by reference.

TECHNICAL FIELD

The present invention relates to active matrix arrays and elements thereof, and particularly relates to digital microfluidics, and more specifically to Active Matrix Electro-wetting-On-Dielectric (AM-EWOD) devices and methods of driving such devices. The invention further relates to an AM-EWOD device with multiple temperature zones which are spatially distributed across the device, and methods of using those zones to control the temperature of fluids in the device.

BACKGROUND ART

Electro-wetting on dielectric (EWOD) is a well-known technique for manipulating droplets of fluid by application of an electric field. Active Matrix EWOD (AM-EWOD) refers to implementation of EWOD in an active matrix array incorporating transistors, for example by using thin film transistors (TFTs). EWOD (or AM-EWOD) is thus a candidate technology for digital microfluidics for lab-on-a-chip technology. An introduction to the basic principles of the technology can be found in "Digital microfluidics: is a true lab-on-a-chip possible?", R. B. Fair, Microfluid Nanofluid (2007) 3:245-281).

FIG. 1 shows a part of a conventional EWOD device in cross section. The device includes a lower substrate 72, the uppermost layer of which is formed from a conductive material which is patterned so that a plurality of electrodes 38 (e.g., 38A and 38B in FIG. 1) are realized. The electrode of a given array element may be termed the element electrode 38. The liquid droplet 4, including a polar material (which is commonly also aqueous and/or ionic), is constrained in a plane between the lower substrate 72 and a top substrate 36. A suitable fluid gap between the two substrates may be realized by means of a spacer 32, and a non-polar fluid 34 (e.g. oil) may be used with the fluid gap to occupy the volume not occupied by the liquid droplet 4. Alternatively, and optionally, the volume not occupied by the liquid droplet could be filled with air or another gas. An insulator layer 20 disposed upon the lower substrate 72 separates the conductive element electrodes 38A, 38B from a first hydrophobic coating 16 upon which the liquid droplet 4 sits with a contact angle 6 represented by θ. The hydrophobic coating is formed from a hydrophobic material (commonly, but not necessarily, a fluoropolymer).

On the top substrate 36 is a second hydrophobic coating 26 with which the liquid droplet 4 may come into contact. Interposed between the top substrate 36 and the second hydrophobic coating 26 is a reference electrode 28.

U.S. Pat. No. 6,565,727 (Shenderov, issued May 20, 2003) discloses a passive matrix EWOD device for moving droplets through an array.

U.S. Pat. No. 6,911,132 (Pamula et al., issued Jun. 28, 2005) discloses a two dimensional EWOD array to control the position and movement of droplets in two dimensions.

U.S. Pat. No. 7,163,612 (Sterling et al., issued Jan. 16, 2007) describes how TFT based thin film electronics may be used to control the addressing of voltage pulses to an EWOD array by using circuit arrangements very similar to those employed in AM display technologies.

Many applications of EWOD technology require that the temperature of liquid droplets be controlled and/or varied. Examples include molecular diagnostics, material synthesis and nucleic acid amplification. A number of approaches have been taken to providing temperature control in a microfluidic device. One approach to achieving thermal control is to control the temperature of the entire device and its housing by external means, e.g. a hot plate. This suffers from the disadvantages that the rates of temperature change that can be achieved are generally low, and that a long time is required for the whole arrangement to reach thermal equilibrium. A number of other approaches to address this problem have been described.

U.S. Pat. No. 7,815,871 (Pamula et al, issued Oct. 19, 2010) discloses a droplet micro actuator system incorporating an EWOD device with one or more heating zones for temperature control.

U.S. Pat. No. 8,459,295 (Kim et al, issued 11 Jun. 2013) discloses a microfluidic device for droplet manipulation according to the EWOD principle, wherein one or more of the electrodes on the bottom substrate comprises a heating element in the form of a patterned electrode.

U.S. Pat. No. 8,339,711 (Hadwen et al, issued Dec. 25, 2012) discloses an AM-EWOD device, with heater elements realized in the same conductive layer that is used to control droplet motion.

US20130026040 (Cheng et al, application published Jan. 31, 2013) discloses a microfluidic platform comprising an AM-EWOD device with an active matrix array of independently addressable heating elements, which may be formed in the same or different substrates, above or below a droplet handling area. This arrangement provides for independent actuation and heating of liquid droplets.

US20110097763 A1 (Pollack et al, application published May 2009; Claims 1-104 and 119-317 canceled) discloses a method to thermal cycle a droplet by actuating it between hot and cold zones via parallel flow-through, meandering flow-through, loop flow-through and aliquoting flow-through and batch thermal cycling protocols.

WO2009003184A1 (Chuanyong, filing date Jun. 27, 2008) describes an apparatus for thermal cycling in a microfluidic device comprising temperature control elements which contact just one surface; or comprising two sets of temperature control elements which contact the top and bottom surfaces, wherein the first set of temperature control elements substantially line up with the second set of temperature control elements.

U.S. Pat. No. 7,090,003 (Beebe et al, publication date Aug. 15, 2006) discloses a device for regulating the temperature of a sample fluid which is caused to flow between two regulating channels. The regulating channels contain regulating fluids that affect heat exchange between the regulating fluid and the sample fluid. The temperature of the sample is regulated by varying the distance between the sample and the regulating fluids.

WO2013037284A1 (Chen et al, filing date Sep. 10, 2012) discloses a microfluidic platform having a microfluidic layer and a contact platform. The microfluidic layer is embedded with microfluidic structure comprising a micro-channel, and the contact platform has a first heater for heating a first area of the microfluidic structure to a first temperature and a second heater for heating a second area of the microfluidic structure to a second temperature. The device maintains the sample within the first area and then rotates to move the sample from the first area to the second area.

Some of these prior art methods have been used to thermal cycle a fluid as part of a biochemical assay, such as Polymerase Chain Reaction (PCR). PCR is well known in the prior art as a process which can amplify a single copy or a few copies of a piece of DNA across several orders of magnitude, generating thousands to millions of copies of a particular DNA sequence.

However, each of these approaches has disadvantages for this and many other chemical and biochemical operations and assays. Disadvantages include limiting the number of samples that can be processed, limiting the number of heating zones, providing large spacing between thermal zones, limiting the throughput of samples that require thermal cycling, providing designs with multiple layers of patterned material that must be aligned with one another. All these disadvantages can add complexity and cost to the manufacturing process and can limit the scope of operation. This an important consideration for Lab on a Chip applications, particularly where the chip must be disposable for reasons such as biological or chemical contamination of the surfaces by the reagents and samples that are used.

SUMMARY OF INVENTION

A first aspect of the present invention provides an EWOD device comprising a top substrate and a bottom substrate spaced apart from one another to define a fluid gap therebetween; wherein the device comprises at least M first temperature control elements and N second temperature control elements for defining (M+N) respective zones of controllable temperature in the fluid gap, the first temperature control elements being in thermal contact with the first substrate and spaced from one another along a direction parallel to the plane of the fluid gap, and the second temperature control elements being in thermal contact with the second substrate and spaced from one another along the direction parallel to the plane of the fluid gap; wherein the first temperature control elements are offset, along the direction parallel to the plane of the fluid gap, relative to the second temperature control elements. The first and second temperature control elements are preferably spaced along the direction parallel to the plane of the fluid gap such that the temperature in a zone is determined by at least one first temperature control element and at least one second temperature control element.

In an EWOD device of this aspect, a zone in the fluid gap is defined by a single temperature element (in general, when the EWOD device is seen from above, a zone in the fluid gap has substantially the same shape and spatial extent as the temperature control element that defines that zone). However, the temperature within that zone is not determined solely by the temperature control element that defines that zone, but is determined by at least one other temperature control element in addition to the temperature control element that defines that zone.

By offsetting the first temperature control elements relative to the second temperature control elements, a zone defined by a first temperature control element is between two zones defined by second temperature control elements, and a zone defined by a second temperature control element is between two zones defined by second temperature control elements.

The first and/or second temperature control elements may extend in a second direction that is crossed with, for example perpendicular to, the direction along which the temperature control elements are spaced. The first temperature control elements may extend parallel to the second temperature control elements. In the embodiment of FIG. 3(a), for example the first and/or second temperature control elements extend into the plane of the figure.

A second aspect of this invention provides a reader for an EWOD device, the EWOD device comprising a top substrate and a bottom substrate spaced apart from one another to define a fluid gap therebetween. The reader comprises at least M first temperature control elements and N second temperature control elements positioned such that, when the EWOD device is inserted in the reader, the first temperature control elements are in thermal contact with the first substrate of the EWOD device and the second temperature control elements are in thermal contact with the second substrate of the EWOD device for defining (M+N) respective zones of controllable temperature in the fluid gap of the EWOD device, the first temperature control elements being offset from one another along a direction parallel to the plane of the fluid gap of the EWOD device and the second temperature control elements being offset from one another along the direction parallel to the plane of the fluid gap of the EWOD device. The first temperature control elements are offset, along the direction parallel to the plane of the fluid gap, relative to the second temperature control elements. A reader of this aspect is generally complementary to a device of the first aspect, except that the first temperature control elements second temperature control elements are provided on the reader rather than on the EWOD device.

The first temperature control elements may be disposed between the first substrate and the fluid gap.

The first temperature control elements may be disposed on an outside surface of the first substrate.

The distance, perpendicular to the plane of the fluid gap, between the fluid gap and a first temperature control element may be different from the distance, perpendicular to the plane of the fluid gap, between the fluid gap and a second temperature control element.

The first temperature control elements may be heating elements and the second temperature control elements are cooling elements.

The first temperature control elements may be controllable independently of one another.

An EWOD device or a reader of the invention may further comprise at least one third temperature control element in thermal contact with one of the first and second substrates, the third temperature control element(s) being controllable independently of the first and second temperature control elements.

A third aspect of the invention provides a method of controlling the temperature within an EWOD device comprising a top substrate and a bottom substrate spaced apart from one another to define a fluid gap therebetween, the method comprising: controlling, using M first temperature control elements and N second temperature control elements, the temperature of N+M zones within the fluid gap, each zone defined by a respective one of the temperature control elements, the first temperature control elements being in thermal contact with the first substrate and offset from one another along a direction parallel to the plane of the fluid gap, and the second temperature control elements being in thermal contact with the second substrate and offset from one another along the direction parallel to the plane of the fluid gap, wherein the first temperature control elements are offset, along the direction parallel to the plane of the fluid gap, relative to the second temperature control elements.

The method comprises controlling the temperature of a zone in the fluid gap using at least one first temperature control element and at least one second temperature control element.

The method may comprise using the temperature control elements to create zones of at least two different temperatures in the fluid gap of the EWOD device.

The method may comprise using the temperature control elements to create, in the fluid gap of the EWOD device, regions of defined thermal gradient in a direction parallel to the plane of the fluid gap of the EWOD device.

A fourth aspect of the invention provides a method of performing droplet operations in an EWOD device, the method comprising: controlling the temperature of zones within the fluid gap of the EWOD device using a method of the third aspect to generate a desired temperature profile within the fluid gap such that the fluid gap contains a first zone at a first temperature and a second zone at a second temperature different to the first temperature; moving a droplet to the first zone in the fluid gap; and moving the droplet to the second zone in the fluid gap.

A method of the fourth aspect may comprise holding the droplet stationary at the second region.

According to the present invention there is provided an EWOD (or AM-EWOD) device with multiple, closely-spaced regions of a defined temperature distributed spatially across it. The device may be configured to move one or more liquid droplets laterally through the device and through regions maintained at different temperatures. This may achieve the purpose of heating, cooling and thermal cycling the one or more droplets.

Specifically, this invention describes an EWOD device which is comprised of a top and bottom substrate separated to form a fluid gap. The device has two or more sets of temperature control elements which are thermally connected to the upper and lower substrates. The purpose of the temperature control elements is to define multiple regions (zones) within the fluid gap of the device which may co-exist at different temperatures. A thermal zone may be defined as a region of the device, of arbitrary size and shape, that is contained wholly or partially within the active area of the device (i.e. the area comprising the array elements) and whose temperature is maintained (to within a certain precision) by the combined influence of the temperature control elements. A zone may be heated or cooled (relative to ambient temperature) to a constant temperature, or optionally may contain within it a gradation of temperature. The multiple temperature zones described by this invention are preferentially and advantageously configured to be closely-spaced relative to one another. The temperature control elements are arranged to permit heat exchange between the elements and the device by transfer of heat. A given temperature control element may be either a source or a sink of heat. There are a number of possible physical device structures for realizing temperature control elements that may be employed, comprising for example, one or more of the following: resistive (Joule) heaters, Peltier-effect based heaters and/or coolers, optical means of heat generation (e.g. lasers), magnetic type heaters (e.g. conduction), heaters or coolers based on the convective, conductive or radiative transfer of heat in or out of the temperature control elements etc.

The heat control elements on the upper and lower substrates are offset from one another in the plane of the fluid gap such that one set of elements define a thermal zone with a first temperature and another set of temperature control elements define another thermal zone with a second temperature. Additional temperature control elements can be used to define additional thermal zones.

The temperature control elements on the upper and lower substrates are in close proximity to each other in the plane of the fluid gap and are therefore thermally "interacting" via transfer of heat through the device. As such the temperature within a thermal zone defined by one set of temperature control elements is influenced by one or more of the other sets of temperature control elements.

In the description of the invention, temperature control elements are defined as being "interacting" if the temperature achieved in a first thermal zone is a function of not only of the co-located temperature control element (i.e. immediately above or below the zone in question), but also of one or more neighboring temperature control elements located on the same or opposite substrate as the co-located temperature control element. Typically the influence of adjacent temperature control elements may be considered to be interacting if the presence of the adjacent temperature control element affects the temperature of the zone by a magnitude greater than 0.1° C., or by greater than 1° C., or by greater than 5° C.

The device may optionally comprise additional temperature control elements whose purpose is to offset the temperature of the device above or below the ambient temperature.

The temperature control elements are typically arranged to be in a plane parallel to the plane of the fluid gap and may typically be arranged to be in contact with outer surfaces of the device, i.e. the upper surface of the top substrate or the lower surface of the bottom substrate. Optionally different temperature control elements may be located at different distances from the fluid gap, for example between the top or bottom substrate and the fluid gap. Providing a temperature control element between the top or bottom substrate and the fluid gap puts the temperature control element closer to the fluid gap and has the advantage that a lower-powered heating element or heatsink is required to achieve a certain temperature in the fluid gap than if an external heating element or heatsink were used.

Each of the individual temperature control elements may be of a size that is the same as or different to the other temperature control elements. The spacing between adjacent temperature control elements may be the same or different in different parts of the device. The temperature control elements of a first set of temperature control element can be offset from the sub elements of a second set of temperature control elements in the plane of the fluid gap such that the first thermal zone is equally spaced between the second thermal zones. In this way the first set of temperature control elements is positioned at the midpoint between the second temperature control elements on the opposite substrate. The temperature control elements can also be positioned to create zones with a higher thermal gradient, for example, by positioning the temperature control elements more substantially in line with each other.

This invention also describes methods to process multiple droplets within the multiple temperature zones.

The advantages of this invention are

Increased density of the thermal zones may be realized (i.e. decreased spacing between thermal zones). This invention achieves a much higher density of thermal zones in comparison to the structures described in the prior art. An advantage of high density thermal zones is that the time taken for a droplet to traverse the distance between adjacent thermal zones is decreased. This may facilitate the rapid thermal cycling of a droplet (or multiple droplets) by moving them between thermal zones. A further advantage of high density thermal zones is that the area of device required to implement them is made smaller. This may reduce device cost, improve manufacturing yield and reduce the overall power requirement of the device.

High density of heating zones also has the advantage of establishing higher thermal gradients. An advantage of high thermal gradients is that droplets spend proportionately less time at intermediate temperatures, i.e., at a temperature intermediate between the temperatures of the two (or more) thermal zones, and proportionately more time at the temperature of the thermal zones. This gives better control of the thermal cycling temperature profile and also better control of chemical or biological processes which occur within the droplet within the thermal zones Reduced thermal cycling time. This invention has potential to reduce the time that it takes to thermally cycle a sample because the closely spaced zones allow a droplet to move quickly from one thermal zones to the next Increased droplet throughput. If the device is used to cycle multiple droplets through the multiple zones, and if the droplets move at a certain speed, the time required to cycle the droplets is reduced. Therefore the total time required to cycle a given total number of droplets is reduced.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 3(b) illustrates a spatial temperature profile obtained in the embodiment of FIG. 3(a);

FIG. 4 is a graph showing the thermal profile of a cross section through the fluid gap of the EWOD device according to a first embodiment of this invention;

FIG. 5 shows in cross section the EWOD device according to a second embodiment of this invention;

FIG. 10 shows a droplet manipulation protocol in accordance with a further exemplary embodiment of the invention FIG. 12 shows a droplet manipulation protocol in accordance with a further exemplary embodiment of the invention

Figure 1:
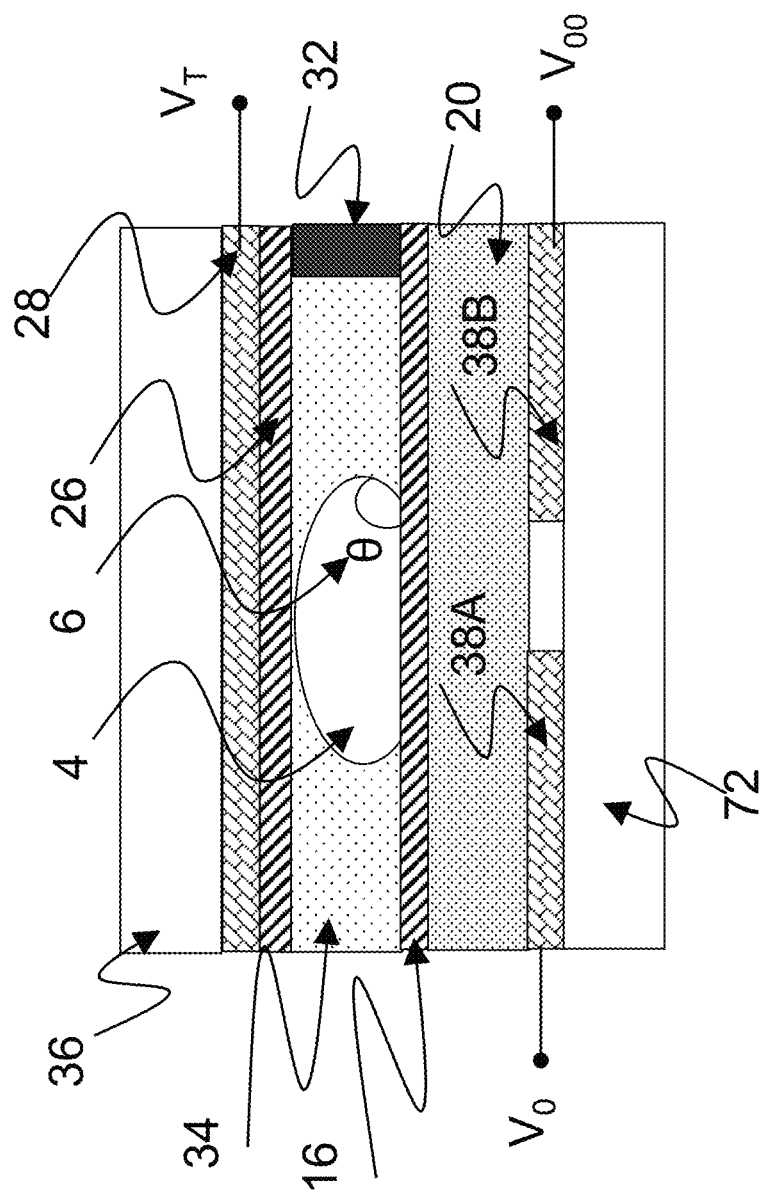
FIG. 1 shows prior art; it is a schematic diagram depicting a conventional EWOD device in cross-section.

DESCRIPTION OF REFERENCE NUMERALS 4 liquid droplet
6 contact angle θ
16 First hydrophobic coating
20 First insulator layer
22 Second insulator layer
26 Second hydrophobic coating
28 Reference electrode
32 Spacer
34 Non-polar fluid
35 Fluid gap
36 Top substrate
38/38A and 38B Array Element Electrodes
40 Reader
41 EWOD device
42 Cartridge upper part
44 Cartridge lower part
46 Cartridge input structure
48 Cartridge output holes
49 Cartridge
50/50a/50b External temperature control elements on the lower substrate
52/52a/52b Internal temperature control elements on the upper substrate
54/54a/54b External temperature control elements on the upper substrate
56 Additional temperature control element in the EWOD device to offset temperature from ambient or inlet temperature
58 Additional temperature control elements on the upper surface to provide different thermal zones
60 Temperature profile of a device according to this invention
62a/62b Radiative heat control elements on the upper substrate
64 Additional radiative heat control element on the upper surface
66a/66b/66c Radiative heat control elements on the lower substrate
68 Additional radiative heat control elements on the lower surface
72 Lower Substrate
74 Thermal zone 1
76 Thermal zone 2

DETAILED DESCRIPTION OF INVENTION

Embodiment 1

Figure 2:
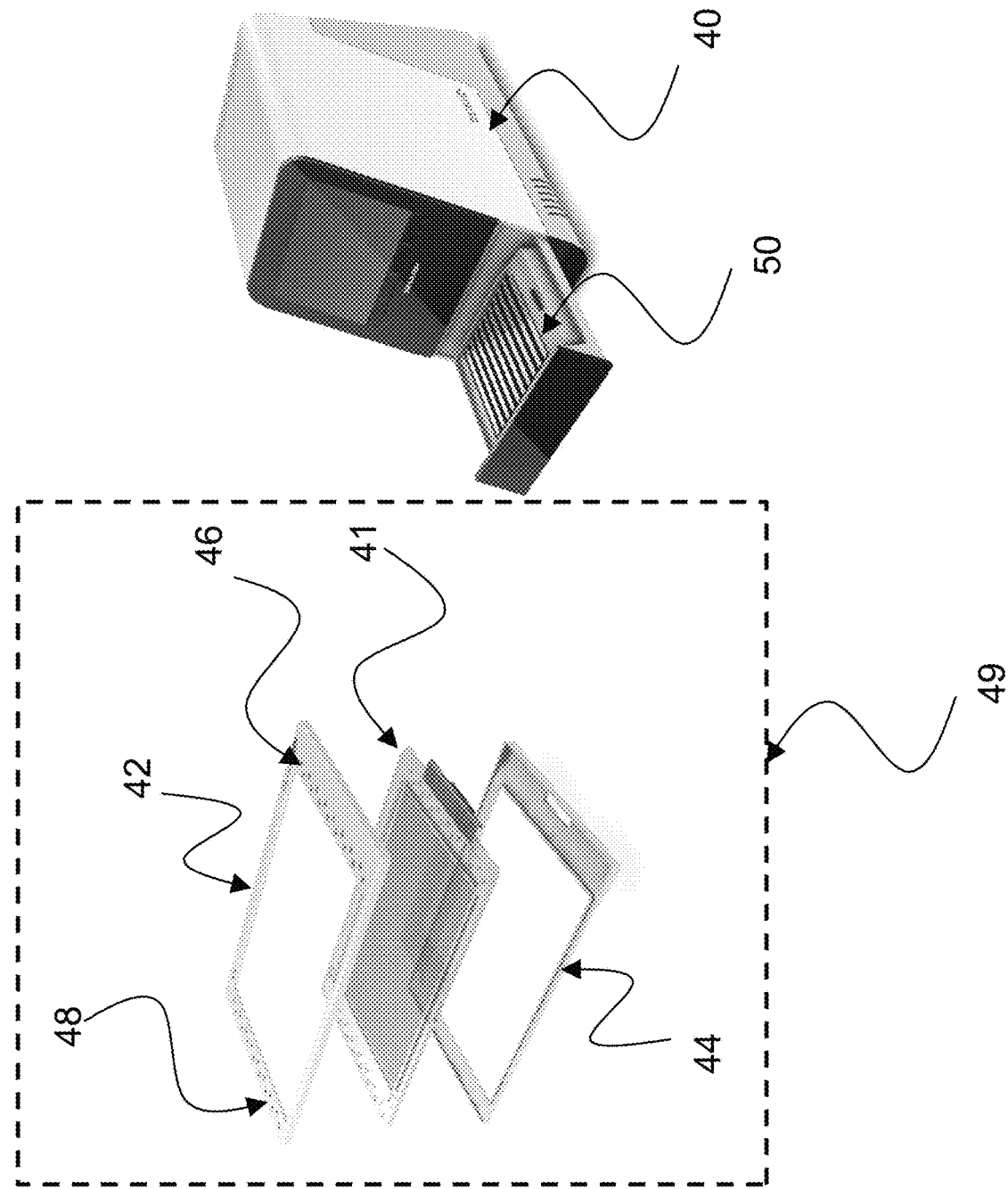
FIG. 2 shows a schematic diagram of the EWOD device, cartridge and reader system according to this invention.
Figure 3A:
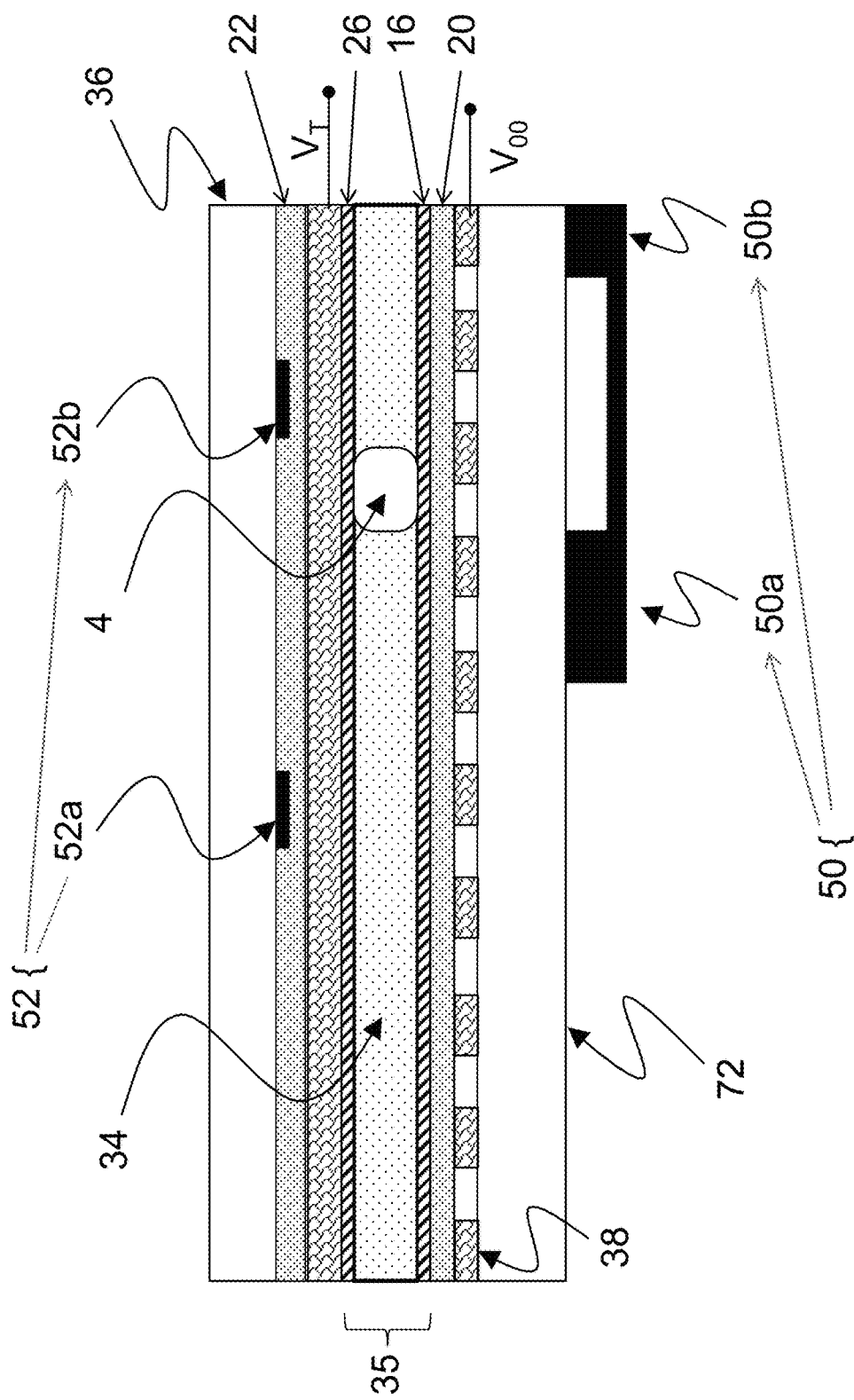
FIG. 3(a) shows in cross section the EWOD device according to a first embodiment of this invention.

FIGS. 2 and 3(a) show an exemplary droplet microfluidic handling system according to a first embodiment of the present invention. The system is in two parts comprising a cartridge 49 and a reader 40.

The cartridge 49 is shown comprised of the EWOD device 41, modularised into an e.g. plastic housing. The modularization may, for example, be comprised of upper 42 and lower 44 plastic parts, though this is a matter of design and many arrangements are possible. Typically the cartridge 49 includes input structures 46 (e.g. holes) for entry of fluids and may optionally also include output structures 48 whereby liquid may be ejected from the device. The input and output structures are connected fluidically to the fluid gap 35 whereby fluid may be input and output to/from the EWOD device. The EWOD device typically contains a dispensing structure for generating liquid droplets 4 in the fluid gap, for example by means of electro-wetting. Typically the cartridge may be configured to perform an assay, test or sample manipulation function. Typically the cartridge may be disposable and for one-time use.

The top and bottom substrates of the EWOD device according to this embodiment are different to prior art devices and can be modified to contain temperature control elements, which are described in the following sections.

The EWOD device is in most regards of a standard construction as is well described in the prior art and typically comprises a lower substrate 72, a top substrate 36, a spacer (not shown in FIG. 3(a), but corresponding to the spacer 32 of FIG. 1) and a non-polar fluid 34 (e.g. an oil) as a surrounding medium within which the liquid droplets 4 are constrained and may be manipulated. In operation the EWOD device is configured to perform droplet operations in accordance with a sequence configurable according to the requirements of the application. The droplet manipulation sequence is executed by selectively actuating the element electrodes 38 to perform multiple droplet operations in series and/or parallel. Typical droplet operations, described in detail in the prior art references, include:

Moving droplets (from one array element to another),
Mixing droplets together (by merging and agitation),
Splitting droplets into two halves,
Dispensing of a small droplet from a large reservoir droplet, and
Inputting droplets onto the array from large input reservoirs, which may interface the device with the outside world.

The reader 40 performs the function of driving and sensing the cartridge. An electrical connection is provided between the EWOD device and the reader. The reader 40 provides, over this connection, electrical power and data control signals to operate the EWOD device, for example to actuate the element electrodes 38, and perform the droplet operations. The reader 40 may also comprise an electrical connection that makes electrical contact with a complementary electrical connector on an EWOD device when the EWOD device is inserted into the reader to enable supply of electrical power to temperature control elements (further described below) located within the EWOD device. Optionally the EWOD device may also include built in sensor functions for sensing the presence or absence of droplets at element electrodes, or for sensing properties of the liquid droplets, e.g. chemical properties or temperature. The reader may also comprise apparatus to measure other aspects of the droplet that are pertinent to the assay under test, for example optical equipment to measure optical properties of the liquid droplets such as absorption, reflection or fluorescence. An optical measurement function may typically be used to readout the result of an assay or biochemical test.

Of particular relevance to this invention is that the cartridge further comprises temperature control elements in carefully designed positional relationship to the fluid gap 35 whose purpose is to create multiple closely-spaced thermal zones within the fluid gap of the EWOD device. According to this invention, the EWOD device is configured such that the fluid gap 35 may be demarcated into multiple thermal zones, which may be heated, cooled, or maintained at different operating temperatures.

A zone may be heated or cooled (relative to ambient temperature) to a uniform temperature over the extent of the zone parallel to the plane of the fluid gap, or optionally may contain within it a gradation of temperature over the extent of the zone parallel to the plane of the fluid gap. The multiple temperature zones described by this invention are preferentially and advantageously configured to be closely-spaced relative to one another. The temperature control elements are arranged to permit heat exchange between the elements and the device, in particular between the elements and fluid and/or droplets contained in the fluid gap 35 of the device, by transfer of heat.

A given temperature control element may be either a source or a sink of heat. There are a number of possible physical device structures for realizing temperature control elements that may be employed, comprising for example, one or more of the following: resistive (Joule) heaters, Peltier-effect based heaters and/or coolers, optical means of heat generation (e.g. lasers), magnetic type heaters (e.g. conduction), heaters or coolers based on the convective, conductive or radiative transfer of heat in or out of the temperature control elements etc.

The temperature zones of this embodiment are preferentially configured to be high density, closely-spaced zones.

According to a first embodiment a first set (52) of temperature control elements 52a, 52b shown in FIG. 3(a) are provided on the top substrate 36. These elements are positioned close to the fluid gap 35 on the inside (lower) surface of the upper substrate 36. According to this embodiment the temperature control elements 52 may be comprised of thin resistive heater bars. They may, for example be comprised of thin layers (100-1000 nm) of chromium, or some other metal including, but not limited to, nickel, chromium, titanium etc., or alloys of these metals. They can also be made from conventional conductive inks based on, but not limited to silver, gold or carbon. They can also be made from other conducting materials such, but not limited to tin oxide, conducting polymers such as PEDOT or graphene. The resistive wires are conveniently contacted in parallel with a fixed electrical potential by electrical bus bars (not shown) which are substantially more conductive than the heaters themselves. This allows the majority of the applied electrical potential to be dropped across the wires, rather than in the bus bars.

The resistive heaters of this first embodiment are offset from a second set 50 of temperature control elements 50a, 50b located on the opposite substrate. In this first embodiment the temperature control elements on the opposite substrate are located in contact with the outside (lower) surface of the bottom substrate and are offset from the resistive heaters in the plane of the fluid gap 35. Typically, and as shown, the second temperature control elements are located opposite the midpoint between two neighbouring first control elements 52a, 52b (in this example between two sub elements of the first set of resistive heaters) on the opposite substrate. The invention is not however limited to the second temperature control elements being located exactly opposite the midpoint between two neighbouring first control elements, and other amounts of offset between the second temperature control elements and the first control elements may be used. For example, if the offset is reduced (e.g. by moving the second set 50 of temperature control elements 50a, 50b relative to the first set of temperature control elements 50a, 50b, while keeping the spacing the same) it is now possible to create different temperature gradients in the device. The temperature gradient between the relatively close (as measured along the plane of the fluid gap) temperature elements will be greater than the temperature gradient between the relatively further apart elements, as shown schematically in FIG. 3(b).

Externally located temperature control elements are typically required to make a good thermal contact with the substrate on which they are provided. This is particularly important with the temperature control elements of this first embodiment since the transfer of heat from the temperature control element 50a, 50b to the substrate 72 is primarily conductive, as opposed to convective or radiative. To improve the thermal contact a flexible, thermally conductive medium (not shown) may be positioned between the temperature control element 50a, 50b and the substrate 72. This may take the form of conductive pastes, foams, pads, or thin layers of fluids such as oils.

According to this first embodiment, the temperature control elements of the upper and lower substrates may be considered as substantially interacting, in that a temperature control element of the upper substrate "interacts" with at least one temperature control element of the lower substrates, such that lateral conduction of heat through the device substrates has an impact on the temperature profile through the EWOD device, and in particular of the thermal zones (located in the fluid gap 35). By describing the temperature control elements as "interacting" is meant that, if the temperature in a first thermal zone that is defined by one of a first set of temperature control elements not only is influenced by that temperature control element but also is influenced by one or more of the other set of temperature control elements; the temperature control elements are "interacting". One aspect of the invention is that interacting thermal control elements cause a substantive influence on the temperature of a droplet located within a particular temperature zone, for example as compared to non-interacting thermal control elements. According to exemplary arrangements the interaction may result in a change in temperature of the order of greater than 0.1° C., or of greater than 1° C., or of greater than 5° C. compared to non-interacting temperature control elements.

In the case where the device is arranged to contain interacting temperature control elements, the additional heat loss (or gain) due to conduction of heat laterally through the substrates and liquids to the adjacent temperature control elements results in various non-obvious effects, as described below, which must be accounted for in the design of the system.

With reference to FIG. 3(a), consider the rightmost temperature control element 52b on the upper substrate 36. The temperature of the device in the vicinity of this element 52b is determined by the heat supplied by this temperature control element and also by The heat supplied, or removed, by the two temperature control elements 50a and 50b on the opposite substrate,
Conduction/convection/radiation of heat from the device to the surroundings.

As a result of the additional heat supplied to, or removed from, the region close to element 52b (by the elements 50a and 50b on the opposite substrate) the temperature of the device in the vicinity of the heater 52b will be different than for non-interacting heaters.

Again with reference to FIG. 3(a), consider the leftmost temperature control element 52a. The temperature of the device in the vicinity of this element is defined by the heat supplied by this temperature control element balanced with:

The heat supplied or removed by the temperature control element 50a on the opposite substrate,
Conduction/convection/radiation of heat to the surroundings.

Since the temperature control element 52a has only one nearest neighbor second temperature control element 50a, in an embodiment where the second temperature control elements 50a, 50b remove heat the temperature in the vicinity of this element 52a will, other factors being equal, be greater than for all subsequent temperature control elements on the upper substrate. In a similar way (assuming there are the same number of temperature control elements 52a, 52b on the upper substrate as temperature control elements 50a, 50b on the upper substrate) the final temperature control element 50b on the lower substrate has only one nearest neighbor temperature control element on the opposite substrate so (in an embodiment where the temperature control elements 50a, 50b remove heat) the temperature in the vicinity of this element 50b will be lower than in the vicinity of all preceding coolers 50a.

According to this first embodiment, the temperature control elements may exhibit a high degree of interaction. An exemplary thermal profile 60 achieved for a design according to the first embodiment is shown in FIG. 4. The profile of FIG. 4 shows the temperature of the fluid layer midway between the substrates (although in practice temperature variations across the cell gap can be ignored compared to lateral temperature variations). Peaks in the temperature profile of FIG. 4 correspond to the position of temperature control elements 52a, 52b on the upper substrate in FIG. 3(a) and minima in the temperature profile of FIG. 4 correspond to the position of temperature control elements 50a, 50b on the lower substrate in FIG. 3(a).

The way in which the temperature control elements 50, 52 are controlled to obtain a temperature profile of the general form shown in FIG. 4 may depend on how the maximum and minimum temperatures of the profile compare to the ambient temperature of the EWOD device. (It is assumed that the fluid in the EWOD device is at or around the ambient temperature of the device.) It may also depend on how strongly interacting are the temperature control elements.

For example, consider a situation where the inlet liquid is at, or around, ambient temperature, and the required maximum and minimum temperatures are both well above the inlet temperature/ambient temperature. If zones are close to one another, the profile of FIG. 4 may be achieved by adding a first amount of heat to the fluid layer using the thermal control elements 52 on the upper substrate 36 and removing a second amount of heat from the fluid layer using the thermal control elements 50 on the lower substrate 72. If the zones are very close then it can happen that the required minimum temperature zone can only be achieved by removing heat from this region.—if heat was not removed from this zone then the heat from adjacent maximum temperature zones would 'bleed' into the low temperature zone, resulting in too high a temperature.

If, however, the zones are well spaced apart, relatively little heat will bleed into a minimum temperature zone from the adjacent maximum temperature zones. As a result the temperature in the minimum temperature zone may drop below the required minimum temperature due to convection/radiation to ambient, so heat may need to be added to achieve the required minimum temperature. That is, for less strongly interacting heaters the thermal profile shown in FIG. 4 may be achieved by adding a first amount of heat via the thermal control elements on the upper substrate 52, and adding a second amount of heat via thermal control elements 52 on the lower substrate 72, whereby the second amount of heat is smaller than the first amount of heat The transition between highly interacting and less strongly interacting thermal control elements depends on substrate thickness, substrate thermal conductivity, distance of the thermal control elements from the fluid gap 35 and rate of heat loss to the surroundings.

Typically and preferably, the upper 72 and lower substrate 36 may be comprised of a material having a relatively low thermal conductivity, for example glass. Glass may also be a convenient material for the EWOD device construction. Substrates can also be made from other materials including, but not limited to silica, sapphire, plastics etc. The low thermal conductivity is advantageous for achieving high thermal gradients, corresponding to closely-spaced thermal zones Low thermal conductivity substrates also reduce the lateral heat flow through the substrates between adjacent thermal zones. This allows thermal zones to be positioned close together while still maintaining a large temperature differential between the zones. According to this first embodiment each of the upper and lower substrates are comprised of glass of thickness less than 1 mm, for example 0.7 mm or 0.5 mm, commensurate with standard display manufacturing.

Typically it is found that the temperature control elements are substantially interacting if the lateral separation is less than approximately 3 cm. In the case where the temperature control elements are interacting, the temperature achieved in the fluid gap 35 in each thermal zone is different to that which would be achieved by non-interacting thermal control elements.

As explained above, in this first embodiment the temperature control elements 50 on the bottom substrate may be controlled to remove a particular quantity of heat from the device while the temperature control elements on the upper substrate may be controlled to provide heat to the device. Under steady state conditions where the temperature in the thermal zones is constant in time, the magnitude of the heat provided by the upper substrate temperature control elements should balance with the heat removed by lower heat control elements plus any heat loss (or gain) to the surroundings (for example convective or radiative heat loss (or gain)). This arrangement creates a cyclic thermal profile 60 with a temperature profile as shown in FIG. 4. The magnitude of the temperature offset and difference between maximum and minimum temperature is determined by the relative magnitude of heat supplied or removed by the two (or more, as described in further embodiments below) sets of temperature control elements. If the heat flow into the upper substrate due to the upper temperature control element and the heat flow out of the lower substrate due to the lower temperature control element are both small in magnitude, the temperature difference between adjacent temperature zones will be small. If the respective heat flows are both large the magnitude of the temperature difference between different zones will be larger.

In certain cases, some minor adjustment in heat flow to individual temperature control elements may be required if the temperature in each of the multiple zones is required to be identical. For example individual temperature control elements 50a,50b; 52a,52b in a set may be controllable independently of other elements in the set, and/or the geometry of individual temperature control elements in a set may be changed slightly between different elements in the set to take account of e.g. non uniformity of the Peltier heating/cooling.

An advantage of the interacting temperature control elements according to the arrangement of the first embodiment is that it allows the thermal zones to be positioned very close together. The pitch (centre-to-centre distance) of adjacent temperature control elements in a set may typically be 5 mm or smaller and still achieve temperature differences of upwards of 40 degrees Centigrade within the fluid gap 35. As a result, a large number of thermal zones may be implemented in a short length of device. As a consequence, a droplet can be thermally cycled multiple times as it traverses through the fluid gap 35 from one side of an EWOD device to the other, or follows another path through multiple thermal zones.

A further advantage of the first embodiment is that very high heating and cooling rates can be achieved as the droplets traverse the thermal zones. Since the thermal mass of small droplets is very low compared to the thermal mass of the thermal zones, the droplets can heat up and cool down in substantial thermal equilibrium with the temperature of the thermal zones. This allows many chemical tests and assays to be performed much more quickly than prior art methods. For example, a droplet may initially be moved to a first zone in the device, which is at a first temperature. The droplet may then be moved to a second zone in the fluid gap which is at a different temperature to the first zone. The process of moving the droplet to a zone having an appropriate temperature may be repeated as often as necessary. A droplet may be stopped temporarily at a zone, or the droplet may be kept moving through the zones in the fluid gap. A described below with reference to FIGS. 9-12, the path of the droplet may be non-repetitive in that the droplet does not pass through any zone twice, or the path of the droplet may pass through one or more zones more than once. The droplet movement through the device may be controlled by any suitable EWOD driving method.

A further advantage of the first embodiment is that closely spaced zones reduce the overall footprint of the EWOD device which can reduce cost, improve manufacturing yield and lower power consumption.

$2^{nd}$ Embodiment

A second embodiment of the invention is shown in FIG. 5 and is an extension of the first embodiment whereby the internal temperature control elements 52a, 52b of FIG. 3(a) are replaced with external temperature control elements 54a, 54b. These external temperature control elements can be located within the reader 40 or alternatively may be fixed to the outer surfaces of the substrate 36. Similarly, the external temperature control elements 50a, 50b can be located within the reader 40 or alternatively may be fixed to the outer surface of the lower substrate 72.

An advantage of this embodiment is that the design of the EWOD device 41 is simplified since no temperature control elements are contained within the EWOD device (that is, contained between the top substrate and the bottom substrate). In this $2^{nd}$ embodiment, the temperature control elements of both the top and bottom substrates may be located within the reader 40 rather than on the EWOD device. Making the temperature control elements of both the top and bottom substrates components of the reader rather than of the EWOD device can make manufacture of the EWOD devices simpler and can therefore lower the cost of the individual EWOD devices. A further advantage is that the supply of electrical power to the temperature control elements can be simplified since the relatively high power connections between the reader and the temperature control elements can be kept within the reader itself. There is no requirement for the electrical connection between the reader and temperature control elements on the EWOD device as described in Embodiment 1. (An electrical connection between the EWOD device and the reader, when the EWOD device is inserted into the reader, is still required to provide electrical power and data control signals to operate the EWOD device and perform the droplet operations—however, this connection is simplified as the electrical power and data control signals required to operate the EWOD device are generally much smaller that the signals required to drive the temperature control elements. This connection may be achieved by, for example, providing electrical contacts from the EWOD drive electrodes on the exterior of the EWOD device, and providing complementary contacts within the reader such that, when the EWOD device is inserted into the reader, contacts on the EWOD device make electrical contact with respective contacts in the reader thereby enabling control circuitry in the reader to provide electrical power and data control signals to operate the EWOD device and perform the droplet operations. Alternatively, a contactless (eg capacitative) connection may be used.)

If the whole temperature control element 54a, 54b and/or 50a, 50b is fixed to the EWOD surface—and so is a part of the EWOD device rather than a part of the reader—then a high power connection must be made between the reader and the temperature control element. However, this embodiment may still provide an advantage over the embodiment of FIG. 3(a), as making the required connection to the external temperature control elements 54a, 54b; 50a, 50b is still easier than making a connection to temperature control elements disposed within the EWOD device such as the elements 52a, 52b of FIG. 3(a)—this advantage applies for any temperature control element that is external to the EWOD device, whether it is provided on the reader or on an external surface of the EWOD device.

$3^{rd}$ Embodiment

Figure 6:
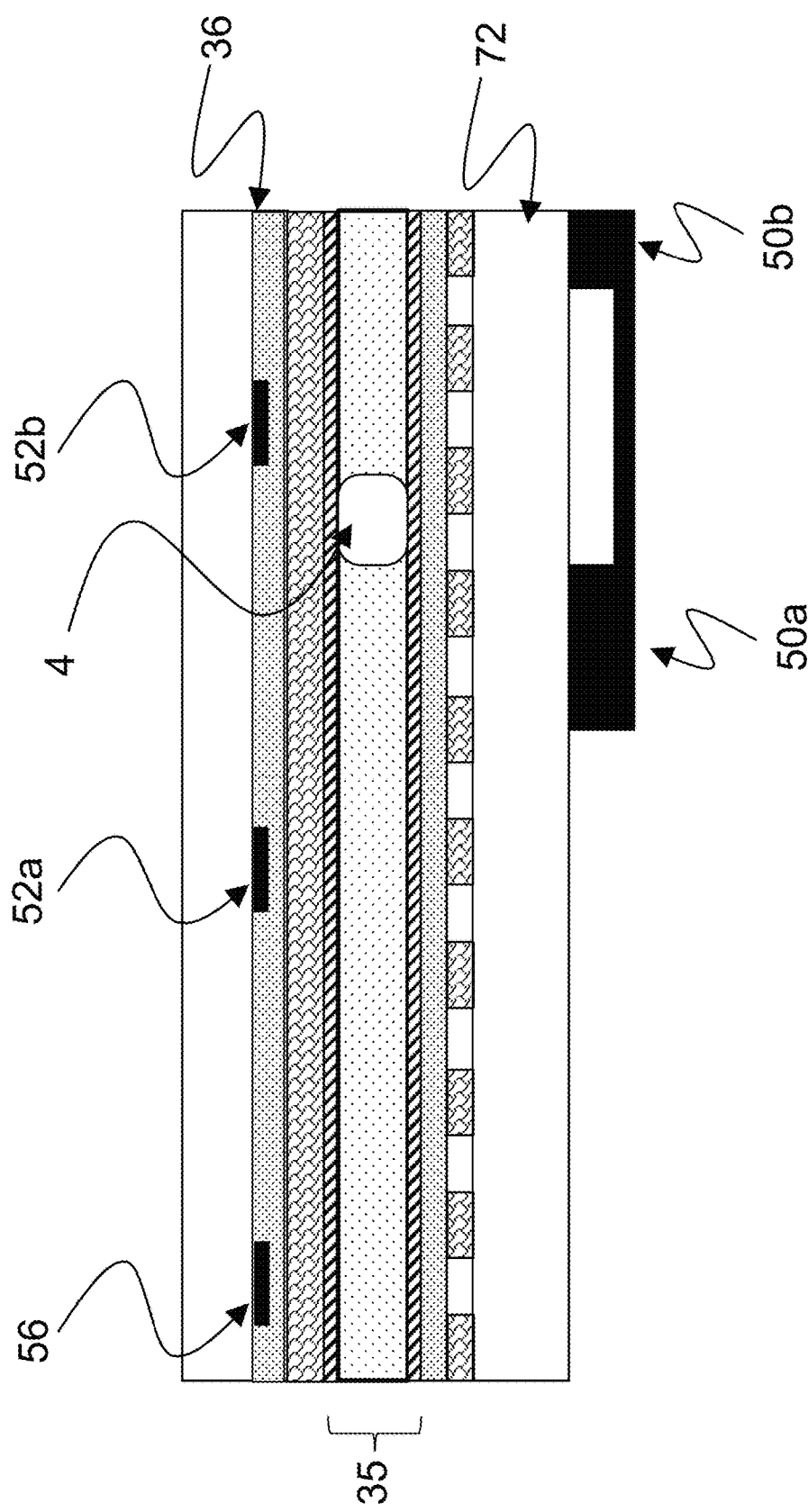
FIG. 6 shows in cross section the EWOD device according to a third embodiment of this invention.

A third embodiment of this invention, shown in FIG. 6, is an extension of either of the first or second embodiments where an additional temperature control element 56 is provided on the upper substrate 36. The additional temperature control element 56 may be a heat source or a heat sink, and may be controllable independently from the first and second sets of temperature control elements. The purpose of the additional temperature control element is to provide further control of the offset temperature of the device above or below the ambient temperature, or temperature of the droplets. Any combination of internal and external additional temperature control elements on the upper substrate 36 or lower substrate 72 is included in this embodiment.

In this embodiment, the shape of the temperature profile created in the fluid gap is still determined by the balance of heat flows from the upper temperature control elements and the lower temperature control elements, as described previously. The additional heat flow from/to the additional temperature control element(s) will shift the temperature profile up or down, while keeping the general shape of the temperature profile unchanged. (In the ideal case that the device is well insulated, the additional heater will influence the temperature of the whole fluid gap, since at equilibrium, the heat will eventually conduct uniformly through the (albeit thermally resistive) fluid and substrate.)

An advantage of this embodiment is that it allows a finer control of the exact temperatures that are achieved in the different thermal zones

$4^{th}$ Embodiment

Figure 7:
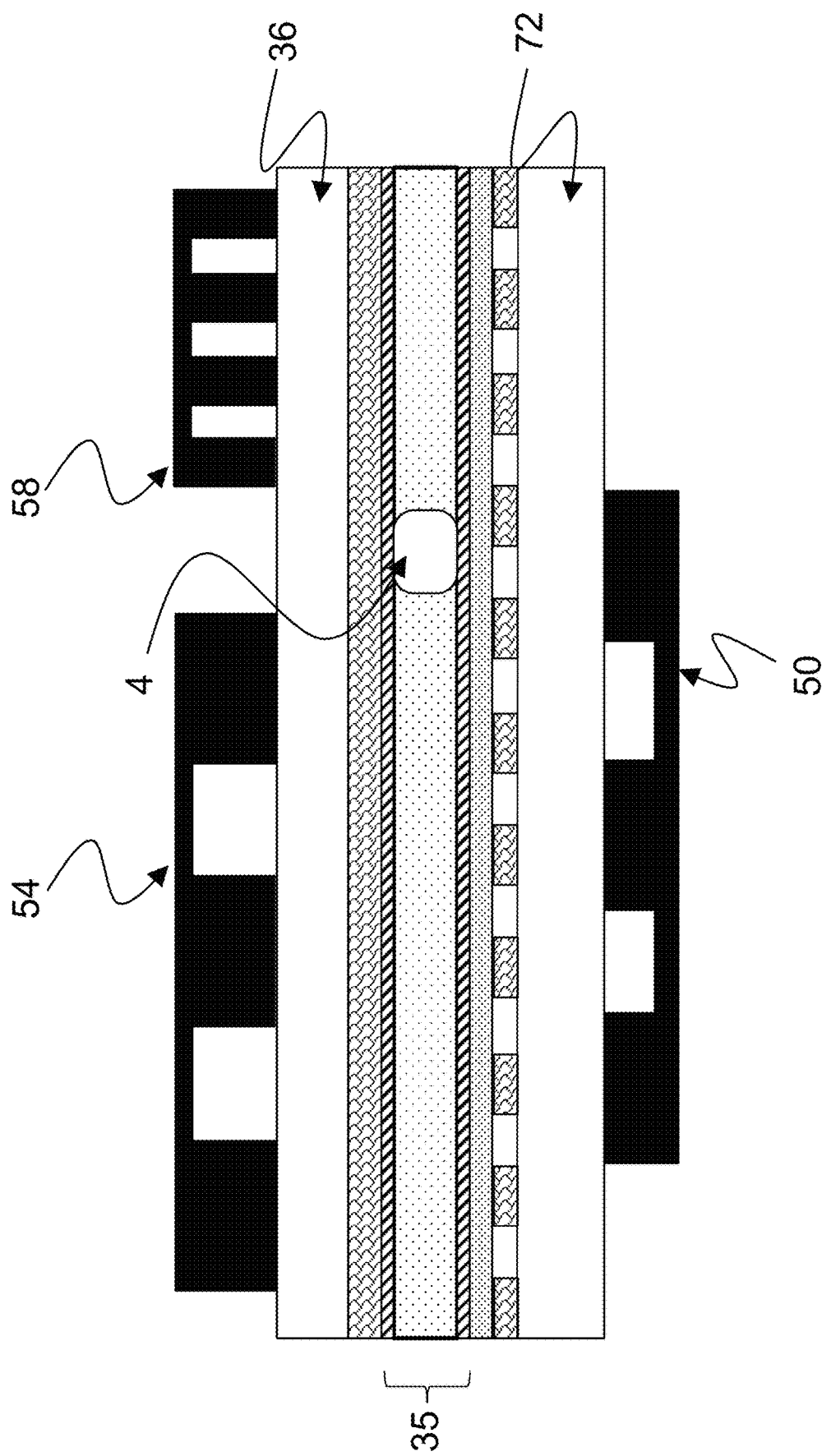
FIG. 7 shows in cross section the EWOD device according to a fourth embodiment of this invention.

A fourth embodiment of this invention is an extension of either of the first, second or third embodiments where an additional set of temperature control elements 58 is provided on the upper substrate 36, as shown in FIG. 7. Any combination of any number of additional sets of temperature control elements on either the upper substrate 36 or lower substrate 72 are included in this embodiment. As in the $3^{rd}$ embodiment, the temperature control elements 50, 54, 58 can be located within the reader 40 or alternatively may be fixed to the outer surfaces of the substrates 36, 72. The temperature control element 58 is controllable independently from the temperature control elements 54. If desired, each part of the temperature control element 58 may be controllable independently from the other parts of the temperature control element 58.

An advantage of this embodiment is that the additional set of temperature control elements can provide a different set of thermal zones with different temperatures and/or different spacing between thermal zones compared to the first set of temperature control elements

$5^{th}$ Embodiment

Figure 8:
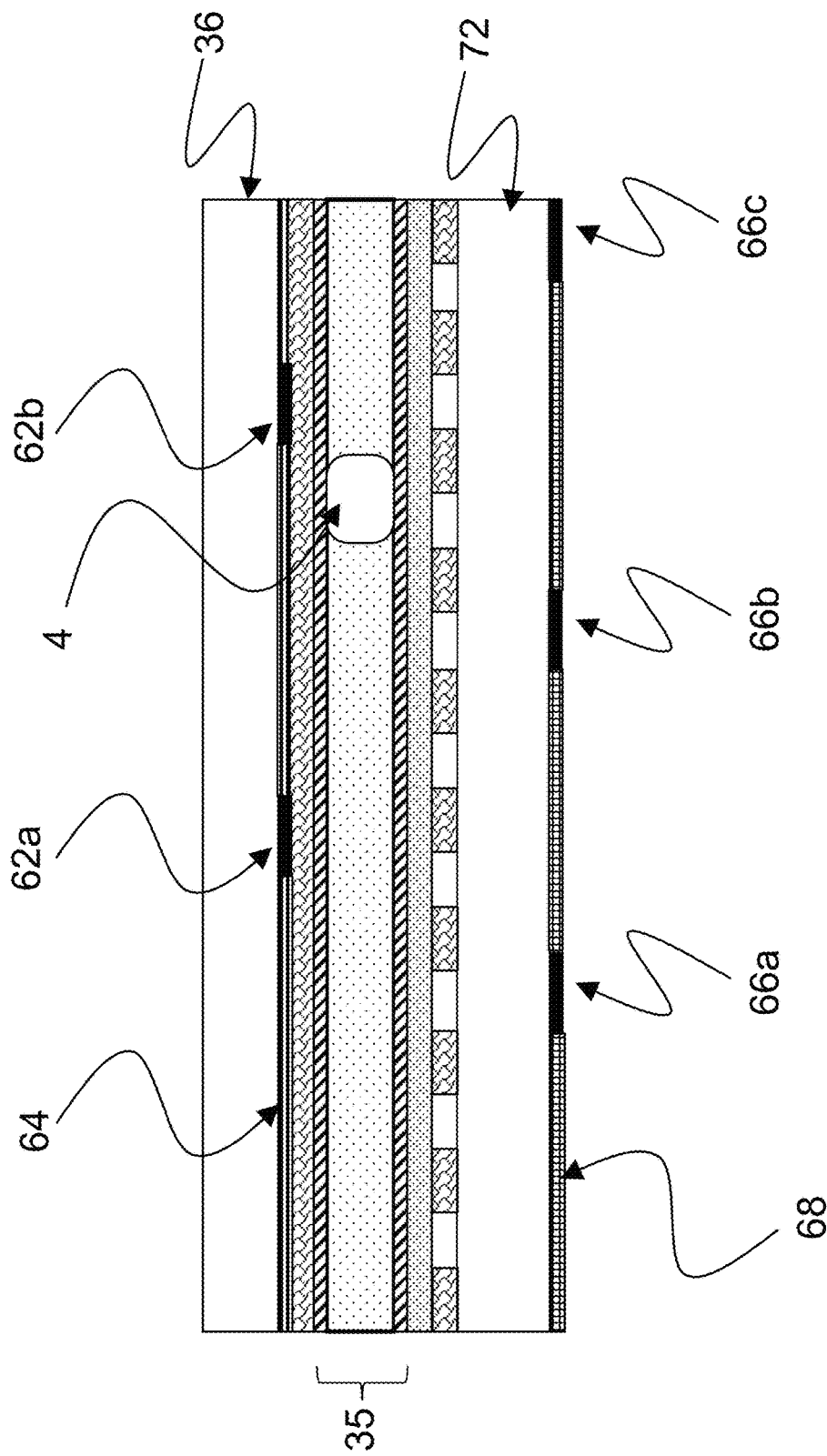
FIG. 8 shows in cross section the EWOD device according to a fifth embodiment of this invention

A fifth embodiment is an extension of any of the first, second, third or fourth embodiments where the temperature control elements are radiative temperature control elements, as contrasted with the conductive temperature control elements of the previous embodiments. As shown in FIG. 8, radiative temperature control elements can be positioned internally or externally on the upper substrate 36 and lower substrate 72. In this fifth embodiment the radiative thermal control elements 62a, 62b on the upper surface serve the purpose of adding heat to the device. They could be composed of a material or structure that absorbs radiant energy from an external radiative source (not shown) such as dyes, pigments, inks, paints, coatings or other multilayer structures. Radiant energy from the external radiative source is absorbed by the elements 62a, 62b, which consequently heat up to provide heating to the thermal zone. The upper substrate 36 should preferably be substantially transparent to radiation from the radiative energy source such that the absorption of radiant heat is confined to the element themselves rather than broadly across the surface of the substrate. In one implementation of this embodiment the substrates are composed of thin glass sheets, so the radiative source should preferentially radiate at wavelengths to which glass is substantially transparent, for example visible and near infra-red wavelengths in the range 300-2500 nm. In other implementations other substrate materials could be employed and the spectral profile of the radiant source adjusted according to their spectral transmittance. An optional layer 64 can be added to reflect radiant heat away from areas opposite to thermal control elements on the opposite substrate. This layer 64 can be located internally as shown in FIG. 8, or externally (eg on the outer surface of the upper substrate 36), and could be composed of materials or structures which are highly reflective to the spectral range of the radiant heat source, for example inks, paints and coatings containing titanium dioxide, barium sulphate or metals films or other multilayer structures.

In this embodiment the radiative thermal control elements are classified as a highly interacting, therefore the elements 66a, 66b, 66c located on the lower substrate 72 serve the purpose of removing heat from the second thermal zones. These elements should preferentially radiate heat away from the EWOD device, preferentially to a cold radiative source, such as a cold surface. The cold surface acts as a radiative heat sink, and radiates very little energy back towards the device. These elements should have high thermal emissivity in order that they radiate heat as effectively as possible and could be composed of high emissivity inks, paints or other layers. An optional layer 68 can be added to reduce heat radiated away from regions opposite the heat source on the upper surface. This layer 68 should be composed of low thermal emissivity materials such as conductive metals or semiconductors, or other low emissivity inks or paints.

The thermal control element on the lower surface could also be classified as less strongly interacting and serve the purpose of adding a portion of heat to the lower substrate 72. In this case the arguments described above for radiative heating elements on the upper substrate 36 apply.

Any combination of any number of radiative thermal control elements on either the upper substrate 36 or lower substrate 72 are included in this embodiment.

6$^{th}$ Embodiment

Figure 9:
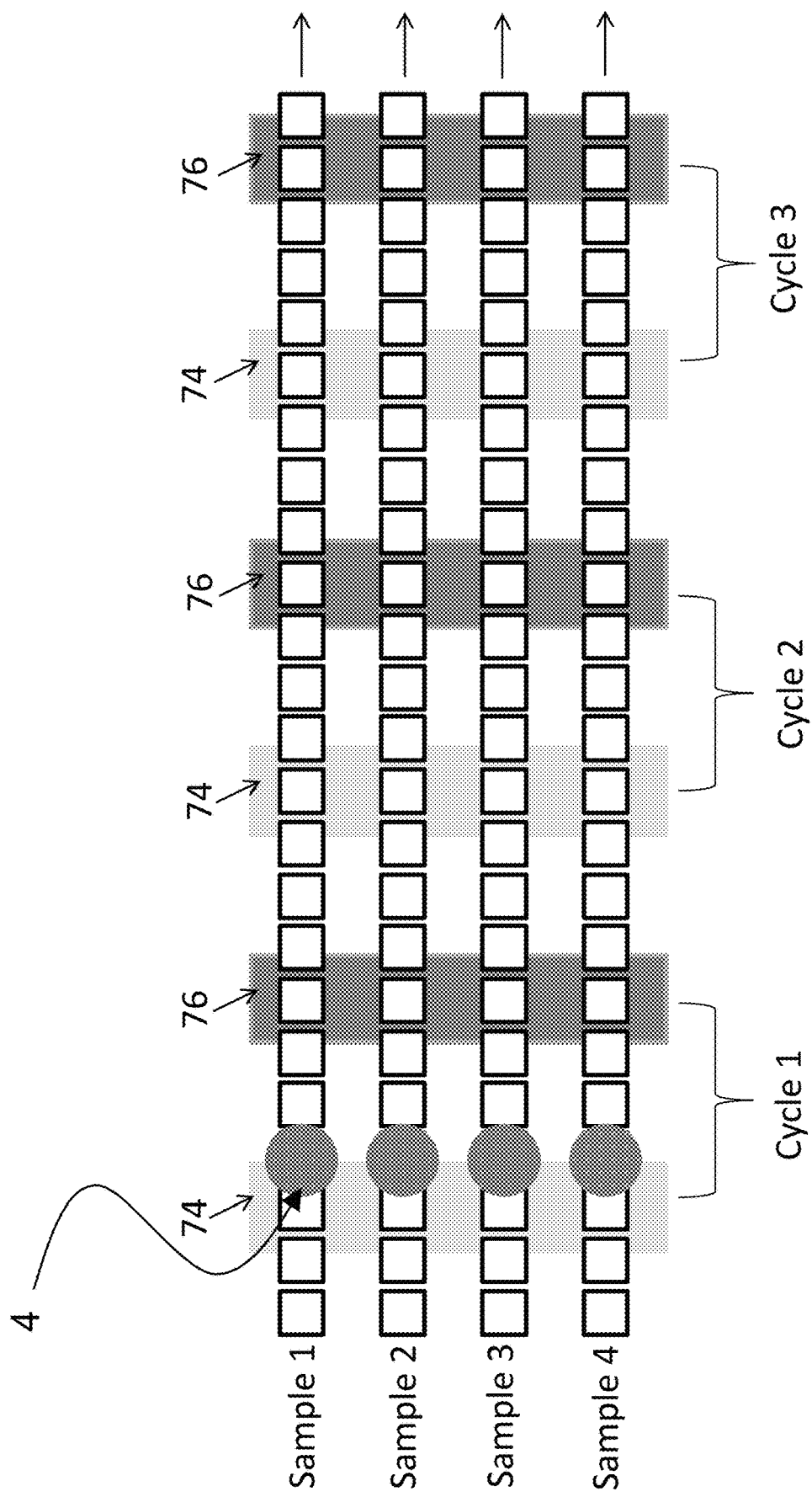
FIG. 9 shows a droplet manipulation protocol in accordance with a further exemplary embodiment of the invention.
Figure 11:
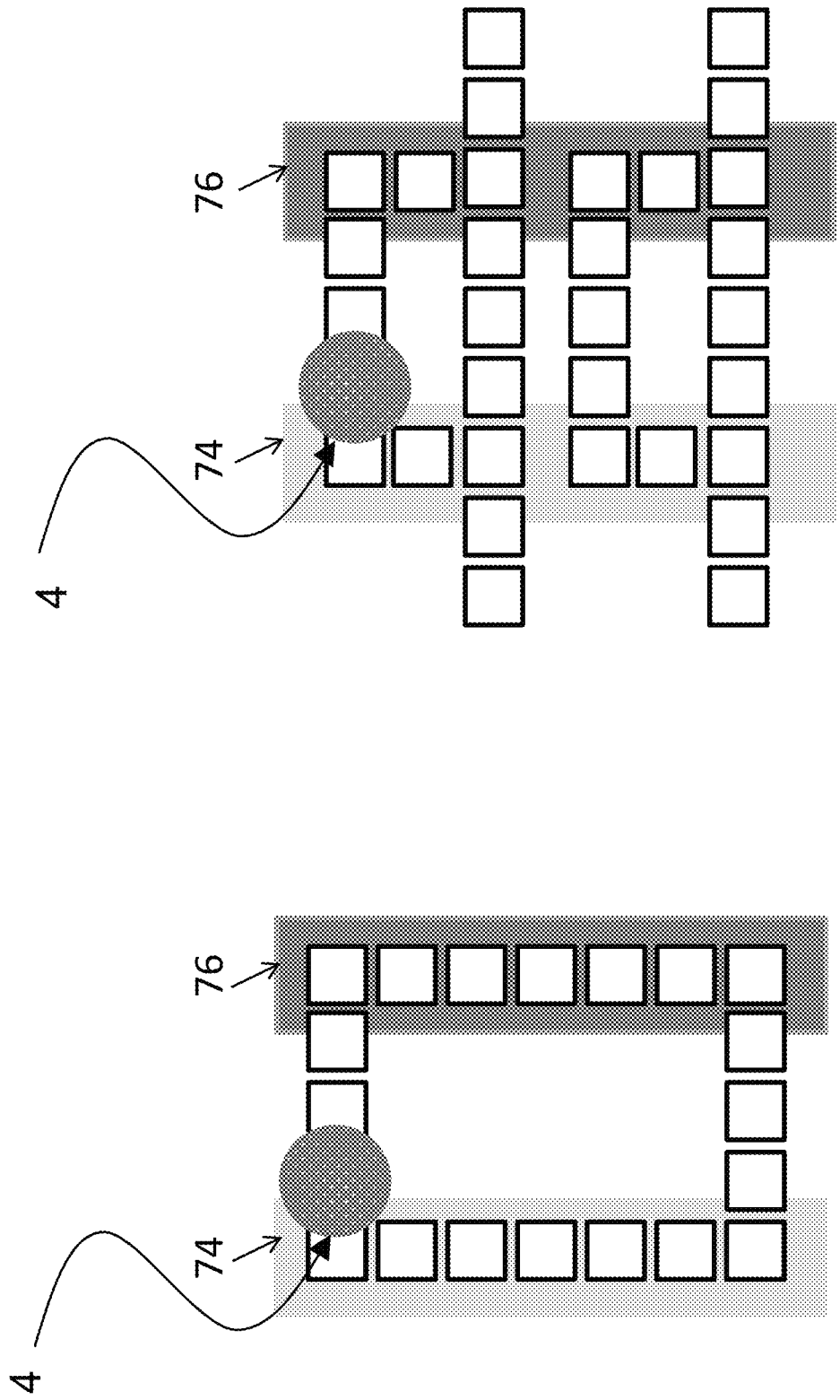
FIG. 11 shows a droplet manipulation protocol in accordance with a further exemplary embodiment of the invention

The device of any of the previous embodiments 1-5 may be arranged so as to change the temperature of at least one droplet contained within the fluid gap 35. This may be achieved by moving the droplet 4, by means of the electrowetting force, between the thermal zones 74 and 76 as shown in FIG. 9. FIG. 9 is a schematic view of an EWOD device from above. The zones 74 are defined by the temperature control elements in thermal contact with one substrate of the EWOD device and the zones 76 are defined by the temperature control elements in thermal contact with the other substrate. For the EWOD of FIG. 3(a), as an example, the temperature control elements 52a, 52b may define the zones 74 and the temperature control elements 50a, 50b may define the zones 76; the zones extend perpendicular to the plane of the paper in FIG. 3(a). The zones 74 may be at different temperature from the zones 76—for example, the zones 74 may correspond to the temperature peaks shown in the thermal profile of FIG. 4, and the zones 76 may correspond to the temperature minima shown in the thermal profile of FIG. 4. Optionally and preferentially, the thermal zones may be arranged to be of high density in the direction perpendicular to the direction of movement of the droplet. In some embodiments droplets can be moved using EWOD drive electrodes (indicated by the squares in FIG. 9-12) in a parallel flow across the thermal zones as shown in FIG. 9, shuttled backwards and forwards between adjacent thermal zones as taught in FIGS. 10, 11 and 12, or in combinations of the above movements. It is possible for multiple droplets to be processed at the same time in an EWOD device of the present invention, for example as shown in FIGS. 9 and 12. Alternatively, a single droplet may be processed at one time.

7$^{th}$ Embodiment

The device of any of the embodiments 1-6 may be configured to provide multiple thermal zones of different temperatures. The multiple thermal zones 74 and 76 are provided to allow a range of thermal conditions within the fluid gap of an EWOD device. Droplets 4 are moved through the different thermal zones by means of the electro-wetting force in order to perform, for example, DNA amplification techniques such as Polymerase Chain Reaction (PCR) or other biochemical assays that require temperature cycling and/or temperature control.

It will be understood that the invention is not limited to the above-described embodiments. For example, in the figures show that the temperature control elements are regularly spaced leading to zones 74, 76 that are regularly spaced apart from one another, but the invention is not limited to this.

INDUSTRIAL APPLICABILITY

The described embodiments could be used to provide an enhanced EWOD device. The EWOD device could form a part of a lab-on-a-chip system. Such devices could be used in manipulating, reacting and sensing chemical, biochemical or physiological materials. Applications include healthcare diagnostic testing, material testing, chemical or biochemical material synthesis, proteomics, tools for research in life sciences and forensic science.

The invention claimed is:

1. An electrowetting on-dielectric (EWOD) device comprising a first substrate and a second substrate spaced apart from one another to define a fluid gap therebetween; wherein the EWOD device comprises at least M first temperature control elements and at least N second temperature control elements for defining M+N zones of controllable temperature in the fluid gap, wherein M and N are integers, the at least M first temperature control elements being in thermal contact with the first substrate and the at least N second temperature control elements being in thermal contact with the second substrate for defining the M+N zones, the at least M first temperature control elements being offset from one another along a direction parallel to a plane of the fluid gap and the at least N second temperature control elements also being offset from one another along the direction parallel to the plane of the fluid gap; wherein the at least M first temperature control elements are further offset, along the direction parallel to the plane of the fluid gap, relative to the at least N second temperature control elements; and wherein the at least M first and at least N second temperature control elements are spaced along the direction parallel to the plane of the fluid gap with a lateral separation of laterally adjacent first and second temperature control elements being configured to permit thermal interaction of said laterally adjacent first and second temperature control elements such that a temperature within a given zone from among the M+N zones of controllable temperature is determined by a temperature control element from among the at least M first and at least N second temperature control elements that defines the given zone, and by at least one other temperature control element from among the at least M first and at least N second temperature control elements that does not define the given zone.

2. The EWOD device as claimed in claim 1 wherein the at least M first temperature control elements are disposed between the first substrate and the fluid gap.

3. The EWOD device as claimed in claim 1 wherein the at least M first temperature control elements are disposed on an outside surface of the first substrate.

4. The EWOD device as claimed in claim 1, wherein a first distance, perpendicular to the plane of the fluid gap, between the fluid gap and the at least M first temperature control elements is different from a second distance, perpendicular to the plane of the fluid gap, between the fluid gap and the at least N second temperature control elements.

5. The EWOD device as claimed in claim 1, wherein the at least M first temperature control elements are heating elements and the at least N second temperature control elements are cooling elements.

6. The EWOD device as claimed in claim 1, wherein the at least M first temperature control elements are controllable independently of one another.

7. The EWOD device as claimed in claim 1, and further comprising at least one third temperature control element in thermal contact with one of the first and second substrates, the at least one third temperature control element being controllable independently of the at least M first and at least N second temperature control elements.

8. A reader for an electrowetting on-dielectric (EWOD) device, the EWOD device comprising a first substrate and a second substrate spaced apart from one another to define a fluid gap therebetween;
wherein the reader comprises at least M first temperature control elements and at least N second temperature control elements positioned such that, when the EWOD device is inserted in the reader, the at least M first temperature control elements are in thermal contact with the first substrate of the EWOD device and the at least N second temperature control elements are in thermal contact with the second substrate of the EWOD device for defining M+N zones of controllable temperature in the fluid gap of the EWOD device, wherein M and N are integers, the at least M first temperature control elements being offset from one another along a direction parallel to a plane of the fluid gap of the EWOD device and the at least N second temperature control elements also being offset from one another along the direction parallel to the plane of the fluid gap of the EWOD device;
wherein the at least M first temperature control elements further are offset, along the direction parallel to the plane of the fluid gap, relative to the at least N second temperature control elements;
and wherein the at least M first and at least N second temperature control elements are spaced along the direction parallel to the plane of the fluid gap with a lateral separation of laterally adjacent first and second temperature control elements being configured to permit thermal interaction of said laterally adjacent first and second temperature control elements such that a temperature within a given zone from among the M+N zones of controllable temperature is determined by a temperature control element from among the at least M first and at least N second temperature control elements that defines the given zone, and by at least one other temperature control element from among the at least M first and at least N second temperature control elements that does not define the given zone.

9. The reader as claimed in claim 8, wherein the at least M first temperature control elements are heating elements and the at least N second temperature control elements are cooling elements.

10. The reader as claimed in claim 8, wherein the at least M first temperature control elements are controllable independently of one another.

11. The reader as claimed in claim 8, and further comprising at least one third temperature control element in thermal contact with one of the first and second substrates, the at least one third temperature control element being controllable independently of the at least M first and at least N second temperature control elements.

12. A method of controlling a temperature within an electrowetting on-dielectric (EWOD) device comprising a first substrate and a second substrate spaced apart from one another to define a fluid gap therebetween, the method comprising:
controlling at least M first temperature control elements and at least N second temperature control elements to define M+N zones of controllable temperature in the fluid gap, wherein M and N are integers, the at least M first temperature control elements being in thermal contact with the first substrate, and the at least N second temperature control elements being in thermal contact with the second substrate for defining the M+N zones, the at least M first temperature control elements being offset from one another along a direction parallel to a plane of the fluid gap and the at least N second temperature control elements also being offset from one another along the direction parallel to the plane of the fluid gap;
wherein the at least M first temperature control elements further are offset, along the direction parallel to the plane of the fluid gap, relative to the at least N second temperature control elements;
wherein the at least M first and at least N second temperature control elements are spaced along the direction parallel to the plane of the fluid gap with a lateral separation of laterally adjacent first and second temperature control elements being configured to permit thermal interaction of said laterally adjacent first and second temperature control elements such that a temperature within a given zone from among the M+N zones of controllable temperature is determined by a temperature control element from among the at least M first and at least N second temperature control elements that defines the given zone, and by at least one other temperature control element from among the at least M first and at least N second temperature control elements that does not define the given zone; and
wherein the method comprises controlling the temperature of a zone from among the M+N zones in the fluid gap using at least one of the at least M first temperature control elements and at least one of the at least N second temperature control elements.

13. The method as claimed in claim 12 and comprising using the at least M first and at least N second temperature control elements to create zones from among the M+N zones of at least two different temperatures in the fluid gap of the EWOD device.

14. The method as claimed in claim 12 and comprising using the at least M first and at least N second temperature control elements to create, in the fluid gap of the EWOD device, zones from among the M+N zones of defined thermal gradient in the direction parallel to the plane of the fluid gap of the EWOD device.

15. A method of performing droplet operations in an EWOD device, the method comprising:
controlling the temperature of the M+N zones within the fluid gap of the EWOD device using the method as defined in claim 12 to generate a desired temperature profile within the fluid gap such that the fluid gap contains a first zone from among the M+N zones at a first temperature and a second zone from among the M+N zones at a second temperature different to the first temperature;
moving a droplet to the first zone in the fluid gap; and
moving the droplet to the second zone in the fluid gap.

16. The method as claimed in claim 15 and comprising holding the droplet stationary at the second zone.

* * * * *